United States Patent
Huang et al.

(10) Patent No.: US 11,009,908 B1
(45) Date of Patent: May 18, 2021

(54) PORTABLE COMPUTING DEVICE AND METHODS

(71) Applicant: mCube, Inc., San Jose, CA (US)

(72) Inventors: Cheng Pin Huang, San Jose, CA (US); Yan Zhong Zhang, San Jose, CA (US); Sanjay Bhandari, San Jose, CA (US)

(73) Assignee: mCube, Inc., San Jose, CA (US)

( * ) Notice: Subject to any disclaimer, the term of this patent is extended or adjusted under 35 U.S.C. 154(b) by 0 days.

(21) Appl. No.: 16/655,124

(22) Filed: Oct. 16, 2019

Related U.S. Application Data (60) Provisional application No. 62/746,481, filed on Oct. 16, 2018.

(51) Int. Cl.
*G06F 1/16* (2006.01)
*G11B 5/55* (2006.01)
*G06F 3/01* (2006.01)

(52) U.S. Cl.
CPC .......... *G06F 1/1626* (2013.01); *G06F 1/1632* (2013.01); *G06F 1/1656* (2013.01); *G06F 1/1694* (2013.01); *G06F 3/017* (2013.01); *G11B 5/5582* (2013.01)

(58) Field of Classification Search
CPC .... G06F 1/1626; G06F 1/1632; G06F 1/1656; G06F 1/1694; G06F 3/017; G06F 2203/04103; G06F 2203/04104; G11B 5/5582
USPC .......................................................... 345/173
See application file for complete search history.

(56) References Cited

U.S. PATENT DOCUMENTS

| | | | |
|---|---|---|---|
| 9,471,109 B1* | 10/2016 | Chng | G06F 1/1694 |
| 2007/0070046 A1* | 3/2007 | Sheynblat | G06F 3/043 345/173 |
| 2008/0048979 A1* | 2/2008 | Ruttenberg | G06F 1/1639 345/158 |
| 2009/0207138 A1* | 8/2009 | Thorn | G06F 3/04883 345/173 |
| 2011/0157055 A1* | 6/2011 | Tilley | G06F 3/04886 345/173 |
| 2011/0199389 A1* | 8/2011 | Lu | G06F 3/041 345/619 |
| 2012/0113053 A1* | 5/2012 | Cato | G06F 3/0416 345/174 |
| 2012/0154273 A1* | 6/2012 | McDade, Sr. | G06F 3/0338 345/157 |
| 2013/0257788 A1* | 10/2013 | Bakshi | G06F 3/0487 345/174 |
| 2014/0035842 A1* | 2/2014 | Bakshi | G06F 1/1643 345/173 |

(Continued)

*Primary Examiner* — Tom V Sheng
(74) *Attorney, Agent, or Firm* — Richard T. Ogawa; Ogawa P.C.

(57) ABSTRACT

A portable computing device includes a housing having a region with a plurality of physical features configured to be swiped by a user during a first period, a first accelerometer configured to determine first perturbations during the first period, a second accelerometer configured to determine second perturbations during the first period of time, and a processor coupled to the first and second accelerometer and configured to determine whether the user has swiped the region during the first period of time in response to the first perturbations and the second perturbations.

20 Claims, 6 Drawing Sheets

(56) References Cited

U.S. PATENT DOCUMENTS

| | | | |
|---|---|---|---|
| 2014/0327626 A1* | 11/2014 | Harrison | G06F 3/04883 345/173 |
| 2014/0368422 A1* | 12/2014 | Gupta | G06F 3/0304 345/156 |
| 2015/0035759 A1* | 2/2015 | Harrison | G06F 3/043 345/173 |
| 2016/0048167 A1* | 2/2016 | Aurongzeb | G06F 1/1656 361/679.26 |
| 2016/0077615 A1* | 3/2016 | Schwarz | G06F 3/041 345/173 |
| 2016/0274722 A1* | 9/2016 | Putzolu | G06F 3/03547 |
| 2017/0068335 A1* | 3/2017 | Nikolsky | G06F 3/04883 |
| 2017/0192599 A1* | 7/2017 | Jin | A63F 13/2145 |
| 2017/0248628 A1* | 8/2017 | Bhandari | B81B 7/0087 |
| 2017/0336881 A1* | 11/2017 | Kasravi | G06F 3/0418 |
| 2018/0074637 A1* | 3/2018 | Rosenberg | G06F 3/0418 |
| 2018/0120930 A1* | 5/2018 | Turner | G06F 3/014 |
| 2018/0353095 A1* | 12/2018 | Boesen | A61B 5/0205 |
| 2019/0392692 A1* | 12/2019 | Kossor | G06F 3/03547 |

* cited by examiner

PORTABLE COMPUTING DEVICE AND METHODS

CROSS REFERENCE TO RELATED APPLICATIONS

This application claims the benefit of U.S. Provisional Application No. 62/746,481 filed on Oct. 16, 2018, which is incorporated by reference herein for all purposes.

TECHNICAL FIELD

The subject disclosure relates generally to portable computing devices including MEMS accelerometers. More specifically, the present invention relates to methods of user input for portable computing devices.

SUMMARY

The present invention relates to portable computing device hardware and methods of use. More specifically, the present invention relates to methods of user input for portable computing devices.

The inventors of the present invention desire to replace physical buttons or switches on portable computing devices, such as laptop computers, tablets, smart phones, etc. The inventors have considered the use of capacitive buttons or regions to replace physical buttons on such devices but believe that there are significant drawbacks. One drawback is such capacitive buttons are believed to provide many false positives as a result of normal user handling; storage in pockets or backpacks; and the like. Another drawback is capacitive buttons are often not sensitive enough to be used under a layer of protective material (e.g. laptop case, phone case, etc.) Still other drawbacks include that capacitive buttons are not sensitive when exposed to a damp or wet environment, and capacitive buttons cannot be used on a metal housing (e.g. premium laptops). Accordingly, capacitive buttons are not believed to be suitable for replacing physical buttons or switches on portable computing devices.

Some embodiments of the present invention include a portable computing device, such as a laptop computer, a tablet, a smart phone, a fitness tracker, a smart watch, or the like having one or more MEMS accelerometers and one or more user texture regions disposed upon the device or as part of the device. In operation, when a user swipes her finger along the texture regions, unique, characteristic vibration patterns are created. These characteristic vibration patterns and other vibrations and physical perturbations of the device are captured by the one or more MEMS accelerometers. Based upon the MEMS accelerometer captured data, the device determines whether the captured data includes the characteristic vibration patterns. If so, the device may perform a programmed function, e.g. powering on or off, increasing or decreasing audio volume; increasing or decreasing brightness; increasing or decreasing zoom level; scrolling or panning a display; input navigation (e.g. selection) to a program or web browsing (e.g. back, forward); setting of variables (e.g. brightness, contrast, gamma, etc. adjustment; input sensitivity; program speed (e.g. video, audio, program playback speed, etc.); or virtually any other function of a device that may be controlled by a user.

In some embodiments, methods may include a finger swiping technique by analyzing the vibration patterns from accelerometer data, utilizing one or multiple accelerometer sensors within a portable computing device to implement the characteristics of swiping detection (e.g. detecting the user swiping a finger, a digit, a fingernail, a pencil, a pen, or the like upon a texture region) on the surface. In some embodiments, a MEMS accelerometer module within a device is used for the ability to sense vibration, orientation, or both, and may sense touching force along a single axis or multiple axis. Sensing vibration along three axes may be useful in some embodiments for a handheld device with input to many applications.

Some embodiments of the present invention provide an apparatus for sensing vibration comprising a LED illuminated user input region (LED lens) located on a user-accessible region of a housing of a portable computing device. In one example, a user-accessible region may be located at a front bottom, middle of a laptop and one or multiple accelerometers to be disposed at some specific locations in the laptop. In operation, the LEDs may turn on to indicate a battery gauge by swiping finger on the LED lens, wherein the first MEMS accelerometer is configured to determine plurality of movement data in response to the user swipe upon the LED lens. In operation, the second or third MEMS sensors may be configured to play as a noise cancellation role, i.e. reduce false positive swipes on LED lens when the device is moving or vibrating while the object is being transported, or the like. In various embodiments, MEMS sensors may be positioned in different locations within a device for false trigger reduction or elimination.

In various embodiments, additional features may be added to a finger swiping region, such as putting a texture upon the LED lens to strengthen the vibration force of the swipe; putting a bumper around the LED lens to make the signal more like double tapping (e.g. providing a hard stop), which may increase on the pattern recognition on the swiping; incorporating tiny springs, flexible layer, or some specific glue to the back side of the LED lens to intensify the vibration that accelerometer sensors can sense when the user swipes their finger. In some embodiments, direction of swiping, e.g. up and down, left and right, etc. may be captured by the MEMS sensors. Such embodiments may be useful for increasing or decreasing audio volume, increasing or decreasing brightness; increasing or decreasing power savings, or the like.

According to one aspect of the invention, a portable computing device is described. One apparatus may include an external housing having an indicator region having a plurality of physical features, wherein the indicator region is configured to be swiped by a user during a first period of time. A device may include a first MEMS accelerometer disposed within the external housing, wherein the first MEMS accelerometer is configured to determine first physical perturbations of the external housing during the first period of time, and a second MEMS accelerometer disposed within the external housing, wherein the second MEMS accelerometer is configured to determine second physical perturbations of the external housing during the first period of time. A system may include a processor disposed within the external housing, wherein the processor is coupled to the first MEMS accelerometer and to the second MEMS accelerometer, wherein the processor is configured to determine whether the user has swiped the indicator region during the first period of time in response to the first physical perturbations and the second physical perturbations.

According to another aspect of the invention, a method for determining user input on a computing device is disclosed. One technique may include receiving physical perturbations in the computing device, generating a first plurality of motion data with a first MEMS device in response to the physical perturbations, and generating a second plurality of motion data with a second MEMS device in response to the physical perturbations. A process may include determining in a processor a first match when the first plurality of motion data substantially matches a set of predefined motion data, and determining in the processor a second match when the second plurality of motion data substantially matches a set of false motion data. A method may include performing with the processor a predefined action associated with the set of predefined motion data in response to the first match, but not the second match The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

The present invention relates to a portable computing device with novel methods for user input.

Figure 1A:
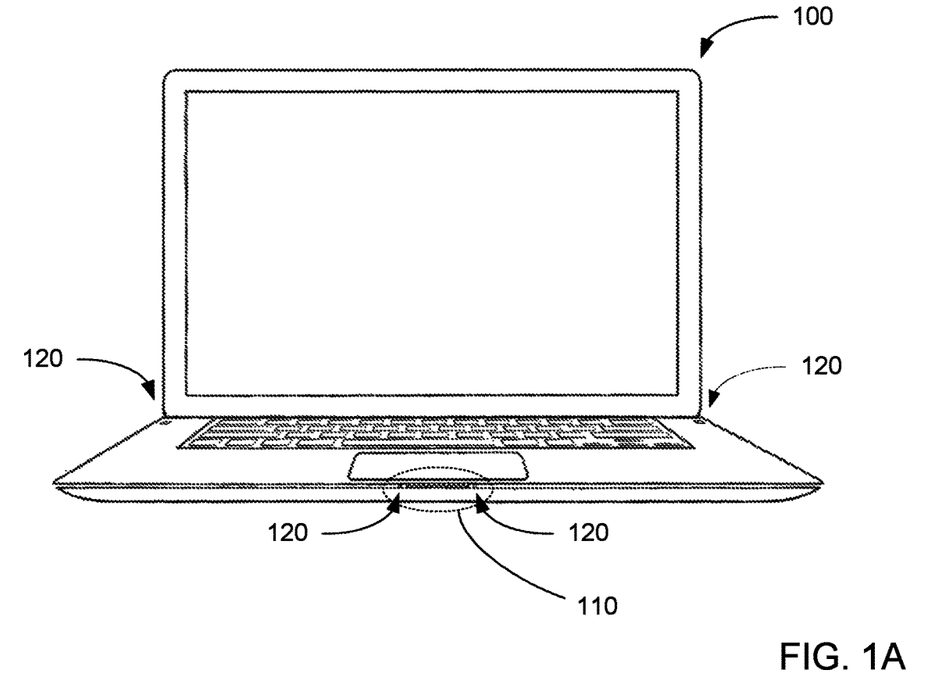
FIGS. 1A-1B illustrate embodiments of the present invention.
Figure 1B:
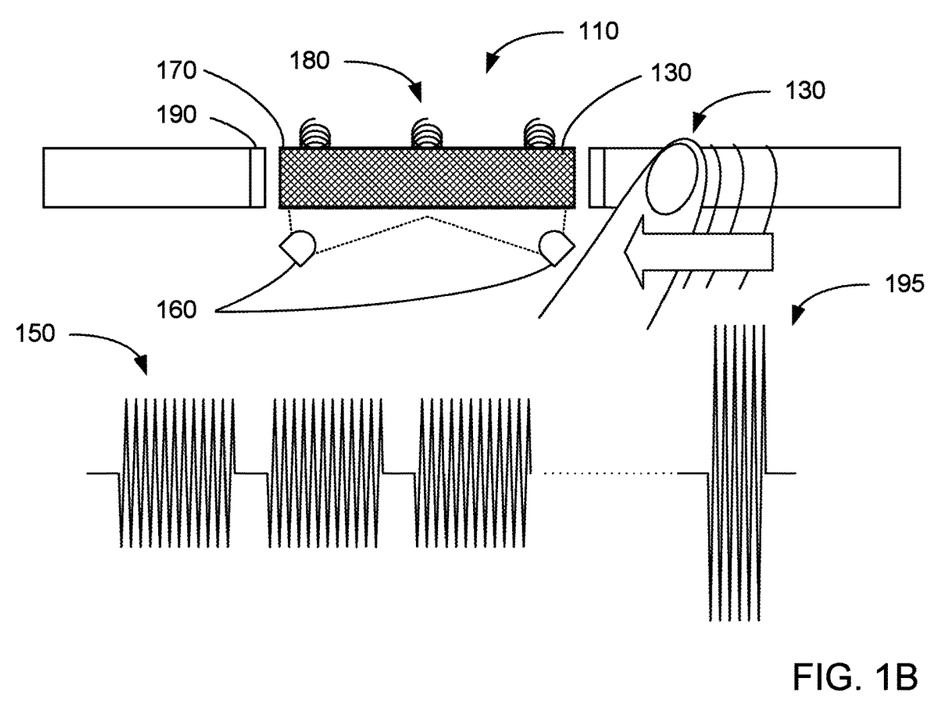

FIGS. 1A-B illustrate some embodiments of the present invention. More specifically, FIG. 1A illustrates a portable computing device 100, such as a laptop computer, smart phone, tablet, fitness tracker, smart watch, or the like, including one or more user interface regions 110. In some embodiments, device 100 may include one or more MEMS accelerometers 120 positioned within portable computing device 100. MEMS accelerometers 120 may be any conventional accelerometer or ultra-low power, ultra-low footprint MEMS accelerometer available from the assignee of the present application.

In various embodiments of the present invention, some MEMS accelerometers 125 may be placed near user interface regions 110, and some MEMS accelerometers 135 may be placed further away. It is contemplated that one or more of MEMS accelerometers 125 and 135 can be used to sense physical perturbations applied globally to device 100 such movement of a laptop in a case while being transported; movement of a smart phone while the user is walking with it in their hand; bumping of a tablet due to in air turbulence; and the like. Additionally, it is contemplated that one or more of MEMS accelerometers 125 may be able to sense smaller local vibrations as a result of a user interacting with user interface regions 110. In various embodiments, as will be described below, using input from MEMS accelerometers 125 and 135, a processor in device 100 may be able to discriminate between the global movements discussed above and localized characteristic vibrations of the user input via user interface regions 110.

FIG. 1B illustrates a close-up of user interface region 110 according to some embodiments of the present invention including a user interface region 110. As illustrated, user interface region 110 typically includes a textured surface 130. In operation, when a user 140 swipes their finger, fingernail, or hard object (stylus, pen, pencil) on textured surface 130, a vibration pattern 150 is produced. MEMS accelerometers 120 monitor physical perturbations, including vibrations and other movements of device 100. When a processor determines that the physical perturbations match the vibration pattern discussed above, the processor can take an action, such as fully powering up or powering down device 100, modifying an audio volume of device 100, modifying brightness of device 100, and the like.

In the embodiments illustrated in FIG. 1B, additional features may be provided to enhance the functionality described herein. In some examples, lights 160 may be combined with user interface region 110 to illuminate texture surface 130. Lights 160 may be positioned next to textured surface 130 or may be remotely positioned and piped to textured surface 130 via a light pipe, and the like. The colors used may indicate different functionality, for example, when in a standby mode, a green-colored light may illuminate textured surface 130 to visually indicate to a user when the user can swipe textured surface 130. Additionally, no light will illuminate textured surface 130 to visually indicate to a user when device 100 is not monitoring MEMS accelerometers 120 for a vibration pattern. In some embodiments, different colored LEDs may be used to visually indicate to the user the different types of functions are to be performed in response to a swipe of texture surface 130. For example: to indicate that device will be turned on, the LEDs may be green; to indicate that device will be turned off, the LEDs may be red; to indicate that the volume will be adjusted, the LEDs may be blue; to indicate that the brightness will be adjusted, the LEDs may be yellow; and the like. As can be seen, the user swipe of textured surface 130 may change functionality while the user is using device 100.

In some embodiments, textured surface 130 may be formed upon different materials 170 such as an opaque or solid (e.g. plastic or metal) material, a translucent or transparent material, may be formed directly upon a housing or casing material of device 100, or the like as will be described below. In various embodiments, lights 160 may provide light behind material 170; on the periphery or next to material 170; or even from within material 170 (e.g. LEDs, electroluminescent material). In some embodiments, material 170 may include fluorescent material, photo-sensitive material, or the like and LED lights 160 may include black-light LEDs, or the like, enabling material 170 to emit visible light.

In the example in FIG. 1B, to increase the magnitude of vibrations 150, material 170 may be secured to the housing of device 100 via springs 180, as illustrated, or other elastic material, such as foam tape, rubber tape, or the like. In operation, as user 140 swipes textured surface 130, the user's finger will occasionally grip textured surface 130 and displace material 170. The user's finger will also occasionally loose grip upon textured surface 130 and material 170 will return to its original position under the urging of springs 180, housing or the like. In various embodiments, the magnitude (e.g. peak to peak height) of the texture material 170 typically increases the magnitude of vibrations 150.

In still other embodiments, bumpers or stops or edges 190 may be provided adjacent to material 170. In such embodiments, as a user swipes textured surface 130, material 170 may be displaced and strike edges 190. As material 170 hits bumpers 190 a characteristic vibration 195 may also be generated and sensed by MEMS accelerometers 120. In operation, the processor may require sensing of vibrations 150 along with characteristic vibration 195 before it determines that user 140 has swiped textured surface 130.

FIGS. 2A-D illustrate additional embodiments of the present invention. More specifically, FIGS. 2A-D illustrate embodiments of user interface regions 200-230 formed integrally on surfaces 240-270 of housings of a portable computing device. More specifically, in contrast to the embodiments illustrated in FIG. 1B, user interface regions 200-230 need not be a separate piece of material from surfaces 240-270. Instead, in FIGS. 2A-D, user interface regions 200-230 may be machined from metal or plastic of the respective housings, may be etched or carved from metal or plastic of the respective housings; may be molded from metal or plastic during fabrication of the respective housings; or the like.

Figure 2A:
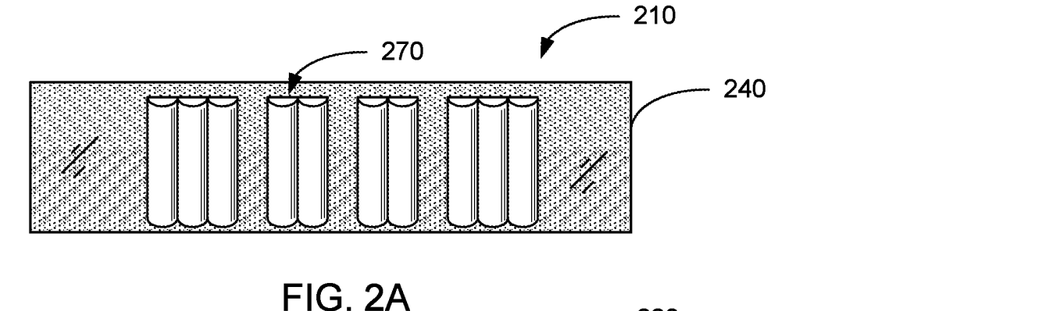
FIGS. 2A-2D illustrate some embodiments of the present invention.

In FIG. 2A, surface 240 of a device, e.g. laptop, smart device, or the like is illustrated having user interface region 210. In this example, user interface region 210 may include a series of cylindrical bumps 270 that protrude from surface 240. In some embodiments, cylindrical bumps 270 may be molded protruding from surface 240 at the same time as when the housing is molded. In various embodiments, user interface region 210 may have different shapes, such as a series of triangular prisms, may be a series of rectangular or square prisms, and the like. Additionally, as shown, the spacing between the geometric features, e.g. cylindrical bumps 270 may be regularly or irregularly spaced, symmetric (as shown), or the like. In some embodiments, the spacings can help provide directional vibrations depending upon the direction the user swipes. The different vibration patterns may be used to perform different actions (e.g. volume up versus volume down).

Figure 2B:
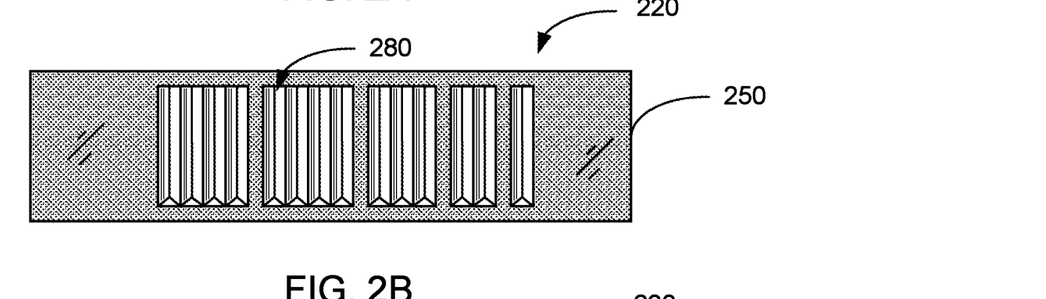

In FIG. 2B, surface 250 of a device, e.g. laptop, smart device, or the like is illustrated having user interface region 220. In this example, user interface region 220 may include a series of machined patterns that are recessed from surface 250. In some embodiments, v-shaped grooves 280 may be machined into surface 250 or may be molded into surface 250 at the same time as when the housing is molded. In various embodiments, user interface region 220 may also have different shapes, such as a series of triangular, rectangular, semi-circular or the like grooves; a fish-scale, chevron, cross-hatch or other machined pattern; and the like. The spacing between the geometric features, e.g. v-shaped grooves may also be regularly or irregularly spaced, symmetric or asymmetric (as shown), or the like.

Figure 2C:
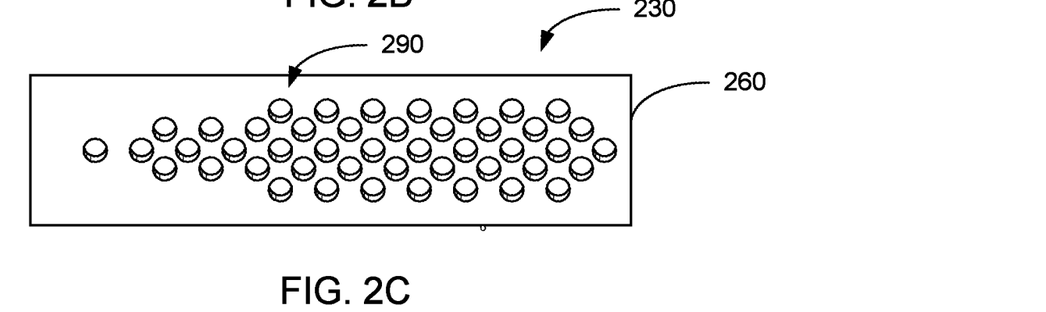

In FIG. 2C, surface 260 of a portable computing device is illustrated having user interface region 230. In this example, user interface region 230 may include a series of machined patterns that go through surface 260. In some embodiments, a series of holes 290 may be drilled or stamped through surface 260 or may be formed through surface 260 at the same time as when the housing is molded. In various embodiments, user interface region 230 may also have different shapes, such as a series of diamonds, rectangles, squares, or the like; a fish-scale, chevron, cross-hatch or other machined pattern; and the like. In various embodiments, user interface region 230 may serve another purpose for the device, for example, user interface region 230 may also be an air intake; a heat exhaust area; a textured logo; a surface decoration; or the like.

Figure 2D:
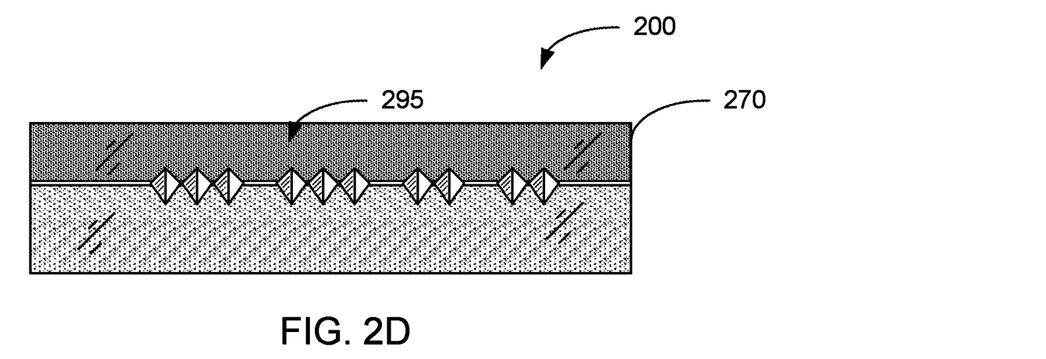

In FIG. 2D, an edge 270 of a top surface and front surface meeting of a portable computing device is illustrated having user interface region 200. In this example, user interface region 200 may include a series of machined patterns 295 that are cut or carved into edge 270. In some embodiments, grooves may be machined into surface 270, or may be molded into surface 270 at the same time as when the housing is molded. In various embodiments, user interface region 200 may also have different shapes, such as a series of triangular cuts 295, rectangular cuts, circular grooves, or the like. The spacing between the geometric features, e.g. v-shaped grooves may also be regularly or irregularly spaced, symmetric or asymmetric (as shown), or the like.

Figure 3A:
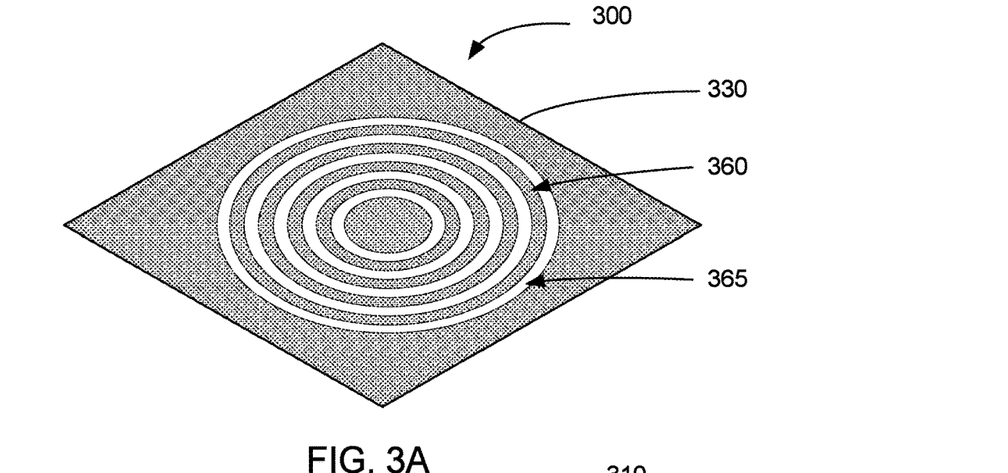
FIGS. 3A-3C illustrate some embodiments of the present invention.
Figure 3B:
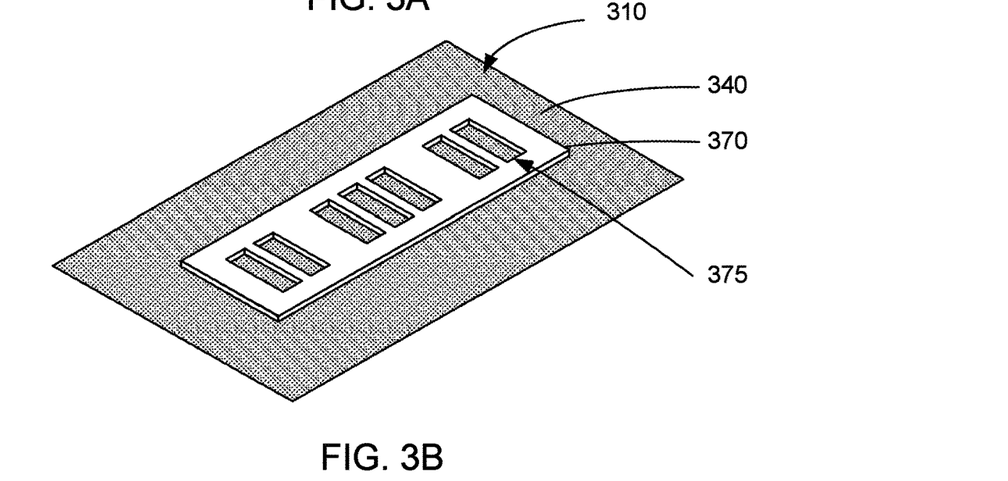
Figure 3C:
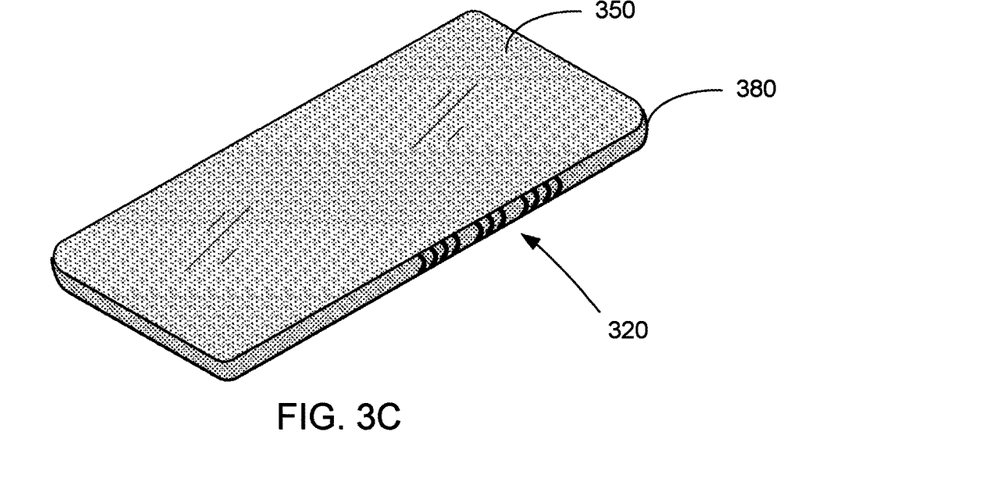

FIGS. 3A-C illustrate additional embodiments of the present invention. More specifically, FIGS. 3A-C illustrate embodiments of user interface regions 300-320 for devices 330-350.

In FIG. 3A, surface 330 of a device, e.g. laptop, smart device, fitness tracker, or the like is illustrated having user interface region 300. In this example, user interface region 300 may include a series of approximately 2 dimensional (2D) geometric features 360 that are formed upon surface 330. In some embodiments, geometric features may be having different finishes or textures, e.g. matte 360 versus glossy 365; smooth versus rough; or the like. Geometric features 360 may be formed by selectively grinding, polishing, or coating portions of user interface region 300, while not treating the remaining portions; selectively laser etching some portions; and the like. Similar to the embodiments above, geometric features 365 may have different 2D shapes, spacings, and the like.

In FIG. 3B, surface 340 of a device, e.g. laptop, smart device, fitness tracker, or the like is illustrated having user interface region 310. In this example, user interface region 310 may also include a series of approximately 2 dimensional (2D) geometric features 375 that are formed upon a media 370 (e.g. self-adhesive tape) that may be adhered to surface 330. Similar to the embodiments above, in some embodiments, geometric features on media 370 may be have different finishes or textures, e.g. matte versus glossy; smooth versus rough; holes (shown) versus solid, or the like. Additionally, geometric features may have different 2D shapes, spacings. In various embodiments, media 370 may be adhered to different portions of the device, at the user's preference. As will be described below, MEMS devices within the device may sense vibrations as a result of a user swiping user interface region 310, and the processor can be calibrated to perform functions based upon the specific sensed vibrations.

FIG. 3C illustrates an example of a case 380 for a device 350 having a user interface region 320. In this embodiment, user interface region 320 may be formed on case 380 using any of the techniques and with any of the shapes, sizes and spacings described above. Similar to the embodiment in FIG. 3B, and is described below, the MEMS accelerometers within device 350 (e.g. cell phone, laptop, tablet, tracker) may sense vibrations from the user swiping interface region 320, and the processor can be calibrated to perform functions based upon the specific sensed vibrations.

Figure 4:
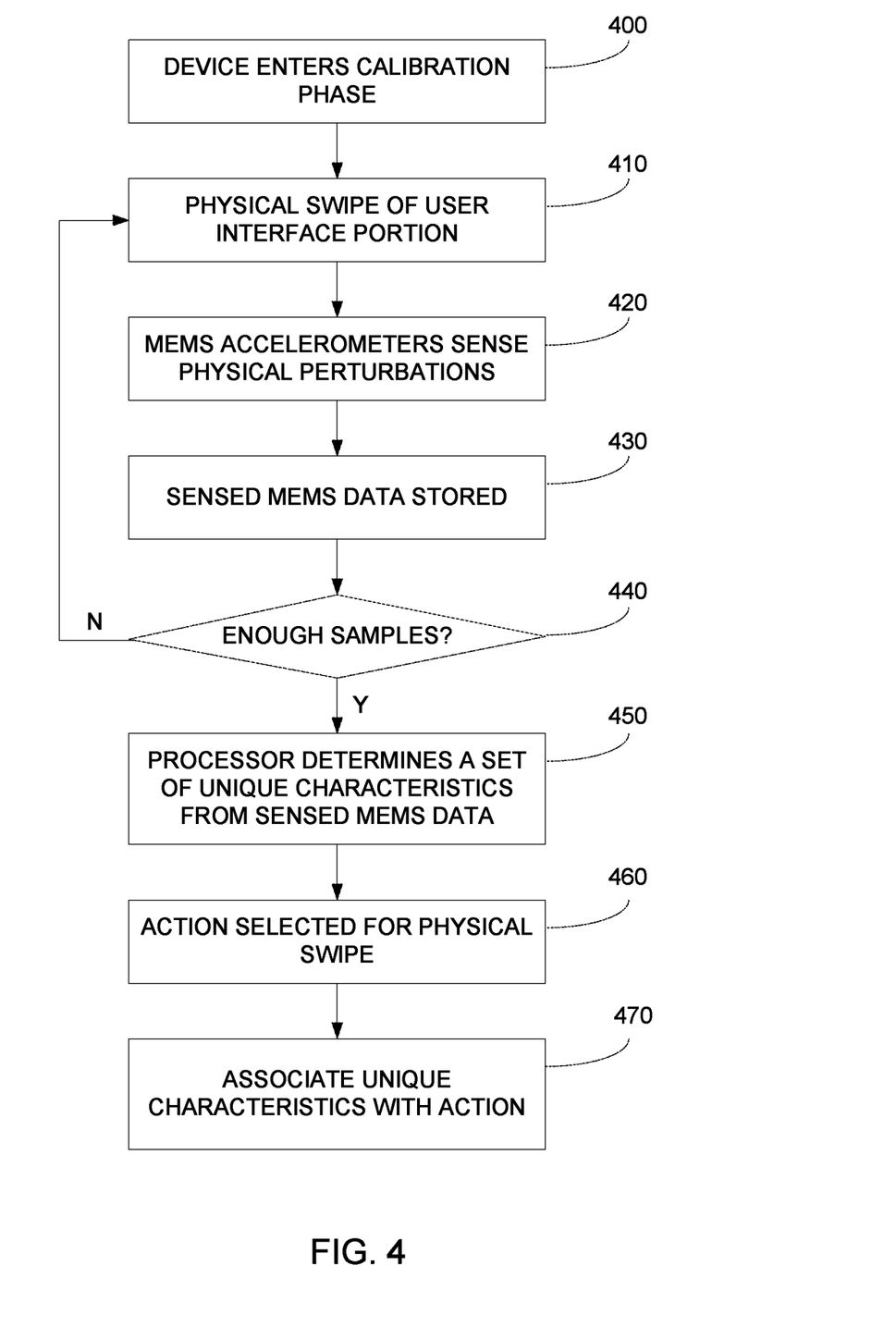
FIG. 4 illustrates a process according to some embodiments of the present invention.

FIG. 4 illustrates a flow diagram according to various embodiments of the present invention. More specifically, FIG. 4 illustrates a method for associating an action with a physical swipe, as discussed above.

Initially, the device is put into a calibration phase, step 400. This may occur at any time from the end of production of the device to delivery of the device to a user, and in some cases may be performed by a user. Next, for example, a user swipes their finger, stylus, fingernail, or the like, against a physical user interface region, as described above, step 410. In various embodiments, the user may be given a specific amount of time to do the action (e.g. 1 second), the system waits until there are no longer any physical vibrations, or the like. As the device vibrates, as a result of the swiping, one or more MEMS devices (e.g. accelerometers) sense the vibrations, and outputs movement data, step 420. The movement data may then be stored, step 430. This process may repeat for a number of trials (e.g. 5 times).

In various embodiments, based upon the movement data stored for multiple trials, the processor may determine unique and identifying characteristics for the movement data, step 450. This may be performed based upon the movement data that has the highest magnitude (e.g. closest MEMS device); may be based upon movement data from all the MEMS devices; or a subset of MEMS devices thereof. In various embodiments, different techniques may be used to determine the unique characteristics of the movement data, such as by averaging, filtering, convolution, principal component analysis, FFT, or the like. In some examples, the unique characteristics may include time-varying movement data in three-directions in the form of a feature vector, or the like. In some embodiments, if movement data is insufficient to determine a unique characteristic, the process described above, may be repeated, thus providing additional movement data.

In some embodiments, an action may be specified to be associated with the user swipe, step 460. As disclosed herein, many actions are contemplated, including: a power on/off action, a brightness adjustment, an audio adjustment, a flashlight on/off action, a zoom in/out function, a program parameter adjustment (e.g. saturation, gamma correction, sharpness, etc.), and the like. In light of the present patent disclosure, one of ordinary skill in the art will be able to understand other actions that may be performed, that are within the scope of embodiments of the present invention.

In FIG. 4, the unique movement data characteristics and association with the selected action may then be stored, step 470.

Figure 5:
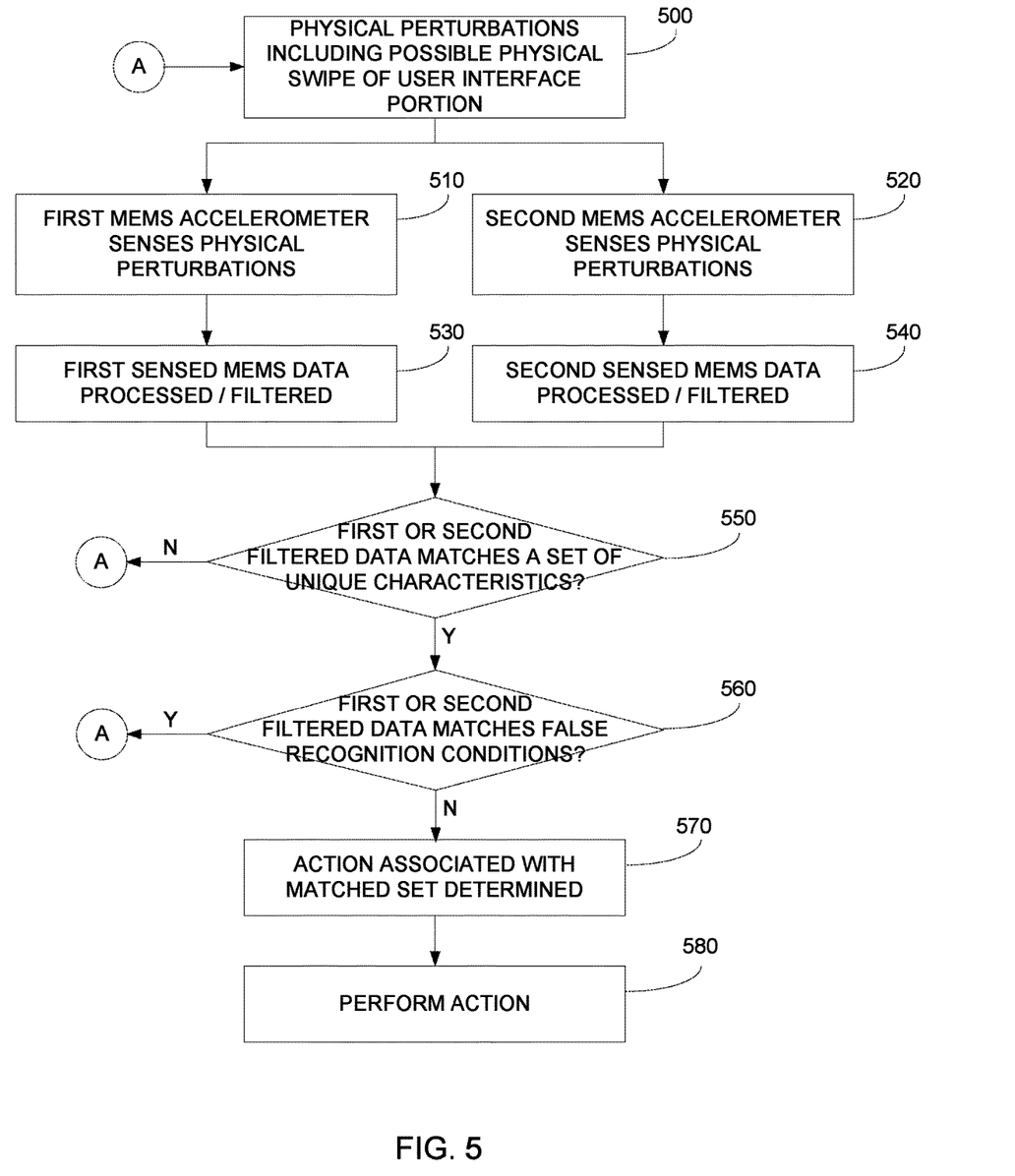
FIG. 5 illustrates a process according to some embodiments of the present invention.

FIG. 5 illustrates a flow diagram according to various embodiments of the present invention. More specifically, FIG. 5 illustrates a method for determining an action to be performed in response to a physical swipe of the user interface region, as discussed above. In various embodiments, it is contemplated that a computing device will have a low-power operating mode and a normal power operating mode. The low-power mode may be similar to hitting a power button of a smart device, such that power consumption is reduced. In such a state, it is contemplated that the computing device will still consume power due to one or more processes running (e.g. text message, e-mail message monitoring, timer, etc.), hardware components (e.g. MEMS accelerometers) being active, applications (e.g. fitness tracking, mapping), operating system routines (e.g. facial recognition, fingerprint), and the like.

In FIG. 5, while in the low-power mode, physical perturbations are received by the device, step 500. The physical perturbations may include physical jostling of the device when it is being used, when it is stored, e.g. in a pocket, a backpack, etc., when it is dropped, or the like. Additionally, the physical perturbations may include vibrations caused by the user swiping their finger across a user interface region, described herein. In various embodiments, the device may be powered on before the MEMS sensors can detect these physical perturbations, and in other embodiments, the device may be in a low power/standby state when the MEMS sensors still monitor and sense the physical perturbations. As an example of the latter case, the MEMS sensors may be put into a lower power sniff mode, that periodically provides movement data to a processor, while the device is in stand-by mode (e.g. smart phone when the power button is pressed).

In response to the physical perturbations, a first and a second accelerometer senses the perturbations, and generates first and second movement data, step 510 and 520. In various embodiments, the first and second movement data is typically time stamped such that a processor can correlate the first and second movement data to a particular perturbation. The movement data are processed in steps 530 and 540. In some embodiments, a high-pass filter may be applied, and in other embodiments, different types of signal processing may also be performed.

In various embodiments, the first set of filtered data and the second set of filtered data are compared to one or more set of unique characteristics, step 550. As discussed above, with regards to FIG. 4, one or more sets of unique characteristic movements, in the form of feature vector, or the like are stored in memory. In this step, a determination is made for one or both of the filtered sets of data whether there is a match. If not, the process can return to the monitoring stage.

If various embodiments there is a match, the first set of filtered data and the second set of filtered data are compared to false recognition characteristics, step 560. It is contemplated that the device might be subject to false positive matches in step 550, due to movement of the device while it is in ordinary use, when the device is in a storage configuration, or the like. In this step, for example, a first set of filtered data may indicate a match with a unique characteristic, however, a second set of filtered data may indicate a match with a false positive. In the case of a false positive, the process can return to the monitoring stage. In various embodiments, filtered data from multiple MEMS devices can be used for steps 550 and 560 to provide more accurate determination of a user swiping upon user interface region of a device.

In FIG. 5, if there is no false positive match, a processor may determine an action to perform, step 570. As discussed herein, the action may be a modification of a device setting, e.g. audio volume, brightness, and the like; the action may be an application input, e.g. selection of an icon, image modification (e.g. brightness, saturation, contrast, etc.), and the like; the action may be launching of a program; and the like. In various embodiments, the action is then performed, step 580. In some cases, a pop-up dialog box may also be provided before the action is performed.

Figure 6:
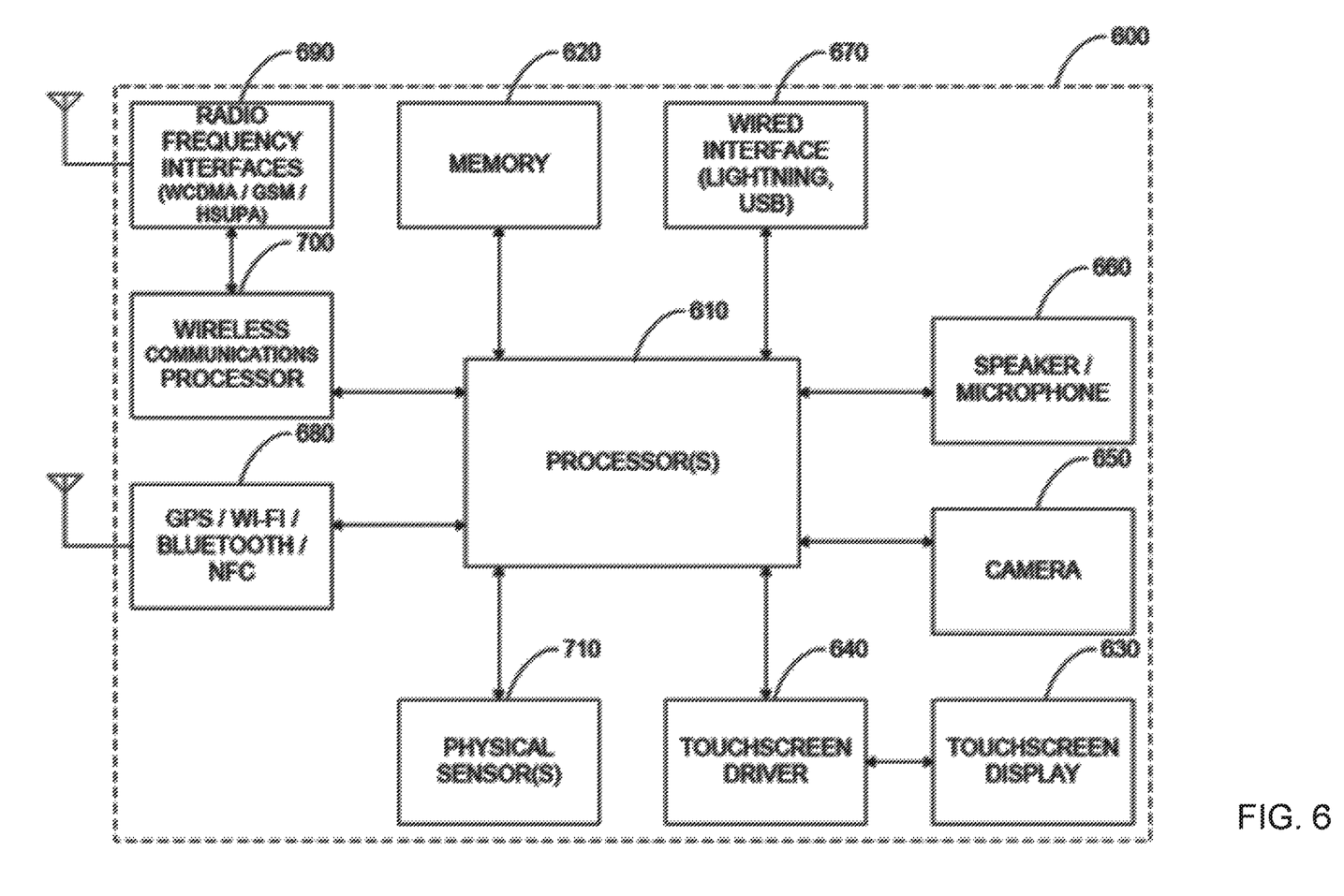
FIG. 6 illustrates an embodiment of the present invention.

FIG. 6 illustrates a functional block diagram of various embodiments of the present invention. More specifically, FIG. 6 illustrates a system including embodiments of the present invention. In FIG. 6, a computing device 600 typically includes some or all of the following: an applications processor 610, memory 620, a touch screen display 630 and driver 640, an image acquisition device 650, audio input/output devices 660, a power supply (e.g. battery) and the like. Additional communications from and to computing device may be provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Android tablet, Apple iPad), a smart phone (e.g. Apple iPhone, Google Nexus, Samsung Galaxy S), a portable computer (e.g. netbook, laptop, ultra book), a media player, a reading device (e.g. Amazon Kindle), a wearable device (e.g. Apple Watch, Android watch, FitBit device, or other wearable device), appliances (e.g. washers, vacuum cleaners), autonomous or semi-autonomous vehicles, drones, IOT device or the like.

Typically, computing device 600 may include one or more processors 610. Such processors 610 may also be termed application processors, and may include a processor core, a video/graphics core, and other cores. Processors 610 may be a processor from Apple (e.g. A9), Qualcomm (Snapdragon), or the like. In other embodiments, the processor core may be an Intel processor, an ARM Holdings processor such as the Cortex or ARM series processors, or the like. Further, in various embodiments, the video/graphics core may be an ARM processor, Imagination Technologies processor PowerVR graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, a touch screen display 630 and driver 640 may be provided and based upon a variety of later-developed or current touch screen technology including: resistive displays, capacitive displays, optical sensor displays, or the like. Additionally, touch screen display 630 may include single touch or multiple-touch sensing capability. Any later-developed or conventional output display technology may be used for the output display, such as TFT-LCD, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments of the present invention, a display output port, such as an HDMI-based port, DVI-based port, or the like may also be included.

In some embodiments of the present invention, image capture device 650 may be provided and include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, proximity detection, or the like.

In various embodiments, audio input/output 660 may be provided and include microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like. Such data may include application data, operating system data, firmware, or the like. Embodiments may include any later-developed or conventional physical interface/protocol, such as: USB, USB-C, Firewire, Apple Lightning connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 8, wireless protocols may include Wi-Fi (e.g. IEEE 802.11 a/b/g/n, WiMax), Bluetooth, IR, near field communication (NFC), ZigBee, ZWave, and the like.

GPS receiving capability may also be included in various embodiments of the present invention, however is not required. As illustrated in FIG. 6, GPS functionality is included as part of wireless interface 680 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, the functionality is provided upon a single IC package, for example the Marvel PXA330 processor, and the like. It is contemplated that some embodiments of computing device 600 need not include the RF functionality provided by RF interface 690 and driver 700.

FIG. 6 also illustrates computing device 600 to include physical sensors 710. In various embodiments of the present invention, physical sensors 710 are multi-axis Micro-Electro-Mechanical Systems (MEMS) based devices being developed by m-Cube, the assignee of the present patent application. Such sensors typically include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. As discussed above, multiple physical sensors 710 may be used FIG. 6 is representative of one computing device 600 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 6. For example, in various embodiments, computing device 600 may lack one or more of the above functional blocks, such as image acquisition unit 650, or RF interface 690 and/or driver or GPS capability, a user input device (e.g. keyboard), or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. For example, in some embodiments, one or more proximity sensors may be placed near the user interface region. In various embodiments, the proximity sensors may be ultrasonic, capacitive, optical, or the like. The proximity sensors may be used to determine if the user's hand, or the like, is placed near to the user interface region. In operation, for example, a proximity sensor to the left and to the right of a user interface region report there is nothing proximate thereto; next, the right proximity sensor senses a surface (e.g. a finger) proximate, while the left proximity sensors stays clear; next the user interface region and MEMS devices captures vibrations (e.g. the finger moving across the embodiments above); then, next, the left proximity sensor senses a surface (e.g. a finger) proximate, while the right proximity sensors stays clear. In response to this sequence of captured data, embodiments may determine the user has swiped the user interface region.

In embodiments, a combination of user input via the user interface region described above, in combination with the proximity determination may be used to further reduce possibility of erroneous user activation. For example, if the smart phone is in a pocket or a tablet is in a backpack, the proximity sensors will sense a surface (fabric) proximate to the user interface region. In such embodiments, regardless of the physical perturbations of the device, action associated with the user swiped the user interface region is not performed.

In other embodiments, combinations or sub-combinations of the above disclosed invention can be advantageously made. In some examples, multiple sensors may also provide redundancy for critical applications. If one sensor is damaged or does not provide appropriate data, in response to a physical perturbation, the sensed data from the remaining sensors may be used to compensate for the loss of the one sensor. In still other examples, environmental sensors, such as temperature, humidity, pressure, radiation sensors or the like may also be incorporated into a system, e.g. provided to the local processor. Such data may be used to compensate for temperature, temperature of coefficient offsets, temperature drift, radiation exposure of at least one, but not all MEMS devices, and the like.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable computing device comprising:
an external housing having an indicator region having a plurality of physical features, wherein the indicator region is configured to be swiped by a user during a first period of time;
a first MEMS accelerometer disposed within the external housing, wherein the first MEMS accelerometer is configured to determine first physical perturbations of the external housing during the first period of time;
a second MEMS accelerometer disposed within the external housing, wherein the second MEMS accelerometer is configured to determine second physical perturbations of the external housing during the first period of time; and
a processor disposed within the external housing, wherein the processor is coupled to the first MEMS accelerometer and to the second MEMS accelerometer, wherein the processor is configured to determine whether the user has swiped the indicator region during the first period of time in response to the first physical perturbations and the second physical perturbations.

2. The device of claim 1
wherein the indicator region comprises a first surface region and a second surface region;
wherein the first surface region is characterized by a first surface finish;
wherein the second surface region is characterized by a second surface finish; and
wherein the first surface finish and the second surface finish are different.

3. The device of claim 2
wherein the first surface finish is characterized by a first surface roughness;
wherein the second surface finish is characterized by a second surface roughness; and
wherein the second surface roughness is at least an order magnitude larger than the first surface roughness.

4. The device of claim 2
wherein the first surface finish is characterized by a polished surface finish; and
wherein the second surface finish is characterized by a matte surface finish.

5. The device of claim 2 wherein portions of the first surface region and portions of the second surface region are interdigitated.

6. The device of claim 2 wherein the indicator region comprises a material selected from a group consisting of: a metal, a metal alloy, plastic, glass, and rubber.

7. The device of claim 1 wherein the indicator region is characterized by a portion of a concave or convex three-dimensional shape, wherein the three-dimensional shape is selected from a group consisting of: a cylinder, an egg shape, and a spheroid.

8. The device of claim 1 wherein the indicator region is formed monolithically upon the external housing.

9. The device of claim 1 wherein the indicator region is characterized by a rectangular shape.

10. The device of claim 1 wherein the plurality of physical features comprises a base material having a first surface region and a second surface region, wherein the first surface region is characterized by a first physical feature, wherein the second surface region is characterized by second physical feature, and wherein the first physical feature is different from the second physical feature.

11. The device of claim 10 wherein the first physical feature is selected from a first group consisting of: a substantially flat surface, a surface having a radius of curvature greater than ½ inch, a concave surface having a portion with radius of curvature greater than 1 inch, a convex surface having a portion with a radius of curvature greater than 1 inch.

12. The device of claim 10 wherein the second physical feature is selected from a second group consisting of: a concave groove, a convex protrusion, a two-dimensional pattern of concave grooves.

13. The device of claim 12 wherein the concave grooves are characterized by a cross-section selected from a group consisting of: v-shaped, square-shaped, curved.

14. The device of claim 1
 wherein the external housing comprises a plurality of intersecting surfaces forming a smooth edge; and
 wherein the indicator region comprises a plurality of physical disruptions within the smooth edge.

15. The device of claim 14 wherein the plurality of physical disruptions within the smooth edge are selected from a group consisting of: a plurality of notches, a plurality of grooves, a plurality of bumps, and a plurality of depressions.

16. The device of claim 14 wherein the smooth edge is selected from a group consisting of: a line and a curve.

17. A method for determining user input on a computing device comprises:
 receiving physical perturbations in the computing device;
 generating a first plurality of motion data with a first MEMS device in response to the physical perturbations;
 generating a second plurality of motion data with a second MEMS device in response to the physical perturbations;
 determining in a processor a first match when the first plurality of motion data substantially matches a set of predefined motion data;
 determining in the processor a second match when the second plurality of motion data substantially matches a set of false motion data; and
 performing with the processor a predefined action associated with the set of predefined motion data in response to the first match, but not the second match.

18. The method of claim 17 further comprising;
 receiving proximity data with one or more proximity sensors;
 recognizing a proximity match when the proximity data substantially matches a set of predefined proximity data; and
 wherein performing with the processor, the predefined action associated with the set of predefined motion data is also in response to the proximity match.

19. The method of claim 17
 wherein receiving the physical perturbations in the computing device is in response to a user swiping an object across an interface region associated with the computing device; and
 wherein the object is selected from a group consisting of a finger, fingernail, a hard object, a stylus, a pen, and a pencil.

20. The method of claim 17 wherein the predefined action is selected from a group consisting of: adjusting an operating system parameter, adjusting an audio volume, adjusting a screen brightness, adjusting an operating parameter of the computing device, putting the computing device into a high-power state, putting the computer device into a low power state, adjusting a parameter in an application running upon the computing device.

* * * * *